US012596346B2

(12) United States Patent
Vu et al.

(10) Patent No.: US 12,596,346 B2
(45) Date of Patent: *Apr. 7, 2026

(54) SYSTEMS AND METHODS FOR INFORMATION-ASSISTED SENSOR REGISTRATION

(71) Applicant: SYMBOTIC LLC, Wilmington, MA (US)

(72) Inventors: Clara Vu, Cambridge, MA (US); Audrey Lewis, Somerville, MA (US); Antonio Fiol-Mahon, Cambridge, MA (US); U. Murat Erdem, Melrose, MA (US); Patrick J. Foy, Reading, MA (US); Ilya A. Kriveshko, Boxborough, MA (US); Scott Denenberg, Newton, MA (US); Alberto Moel, Cambridge, MA (US)

(73) Assignee: Symbotic LLC, Wilmington, MA (US)

( * ) Notice: Subject to any disclaimer, the term of this patent is extended or adjusted under 35 U.S.C. 154(b) by 454 days.

This patent is subject to a terminal disclaimer.

(21) Appl. No.: 17/994,655

(22) Filed: Nov. 28, 2022

(65) Prior Publication Data

US 2023/0099717 A1      Mar. 30, 2023

Related U.S. Application Data

(63) Continuation-in-part of application No. 17/412,912, filed on Aug. 26, 2021, now Pat. No. 11,543,796, (Continued)

(51) Int. Cl.
*G05B 19/402*      (2006.01)
*G01S 17/04*      (2020.01)
(Continued)

(52) U.S. Cl.
CPC ............ *G05B 19/402* (2013.01); *G01S 17/04* (2020.01); *G05B 19/4061* (2013.01); (Continued)

(58) Field of Classification Search
CPC .............. G05B 19/402; G05B 19/4061; G05B 2219/37555; G05B 2219/40557; (Continued)

(56) References Cited

U.S. PATENT DOCUMENTS 9,251,598 B2      2/2016  Wells et al.
9,452,531 B2      9/2016  Kikkeri et al.
(Continued)

FOREIGN PATENT DOCUMENTS

EP            0328687 A1      8/1989
JP            06/270083 A      9/1994
(Continued)

OTHER PUBLICATIONS

Jeremy A. Marvel, et al., Tools for Robotics in SME Workcells: Challenges and Approaches for Calibration and Registration, National Institute of Standards and Techology NISTIR 8093, Nov. 1, 2015, pp. 1-29.
(Continued)

*Primary Examiner* — Gregory M Desire
(74) *Attorney, Agent, or Firm* — Perman & Green, LLP

(57)            ABSTRACT

Image sensors distributed about a workcell including industrial machinery are registered using a registration object and an information tag associated therewith. The tag contains information specifying the location of the object and/or the pose of the object. This information is acquired along with images of the registration object, and the sensors are registered based at least in part on the images and the acquired information.

18 Claims, 9 Drawing Sheets

Related U.S. Application Data which is a continuation of application No. 16/553, 738, filed on Aug. 28, 2019, now Pat. No. 11,156,981.

(60) Provisional application No. 62/724,945, filed on Aug. 30, 2018.

(51) Int. Cl.

| | | |
|---|---|---|
| *G05B 19/4061* | (2006.01) | |
| *G06T 7/00* | (2017.01) | |
| *G06T 7/30* | (2017.01) | |

(52) U.S. Cl.
CPC ............... *G06T 7/001* (2013.01); *G06T 7/30* (2017.01); *G05B 2219/37555* (2013.01); *G05B 2219/40557* (2013.01); *G06T 2207/10028* (2013.01); *G06T 2207/30164* (2013.01)

(58) Field of Classification Search
CPC . G06T 7/30; G06T 7/001; G06T 2207/10028; G06T 2207/30164; G01S 17/04
See application file for complete search history.

(56) References Cited

U.S. PATENT DOCUMENTS

| | | | | |
|---|---|---|---|---|
| 9,524,426 | B2 * | 12/2016 | Kim ..................... | G06V 10/764 |
| 9,796,089 | B2 | 10/2017 | Lawrence, III et al. | |
| 9,947,134 | B2 * | 4/2018 | Komenczi .............. | H04N 13/25 |
| 10,126,116 | B2 | 11/2018 | Becker | |
| 10,445,944 | B2 | 10/2019 | Galera et al. | |
| 10,521,625 | B2 * | 12/2019 | Takeshima ............. | H04N 23/90 |
| 10,803,611 | B2 | 10/2020 | Kay et al. | |
| 10,919,144 | B2 | 2/2021 | Sinnet | |
| 2013/0086801 | A1 * | 4/2013 | Mimura .................. | B23P 21/00 |
| | | | | 29/720 |
| 2013/0201292 | A1 | 8/2013 | Walter et al. | |
| 2014/0207285 | A1 | 7/2014 | Sakabe | |
| 2016/0035079 | A1 * | 2/2016 | Tenney ..................... | G06T 7/80 |
| | | | | 382/153 |
| 2016/0354927 | A1 | 12/2016 | Kikkeri et al. | |
| 2017/0302905 | A1 | 10/2017 | Shteinfeld et al. | |
| 2018/0222052 | A1 | 8/2018 | Vu et al. | |
| 2019/0262991 | A1 | 8/2019 | Sugiyama et al. | |
| 2019/0262993 | A1 | 8/2019 | Cole et al. | |
| 2020/0143564 | A1 | 5/2020 | Ross | |
| 2020/0164516 | A1 | 5/2020 | Lehment et al. | |

FOREIGN PATENT DOCUMENTS

| | | | |
|---|---|---|---|
| JP | 2004/163200 | A | 6/2004 |
| JP | 2009/121053 | A | 6/2009 |
| JP | 2012/057960 | A | 3/2012 |
| WO | WO 2002/023121 | A1 | 3/2002 |
| WO | WO 2012/091807 | A2 | 7/2012 |
| WO | WO 2018/148181 | A1 | 8/2018 |

OTHER PUBLICATIONS

Tim Beyl, et al., Time-of-flight-assisted Kinect camera-based people detection for intuitive human robot cooperation in the surgicial operating room, International Journal of Computer Assisted Radiology and Surgery, Springer, DE, vol. 11, No. 7, Nov. 14, 2015, pp. 1329-1345.

Justinas Miseikis, et al., Multi 3D camera mapping for predictive and reflexive robot manipulator trajectory estimation, 2016 IEEE Symposium Series on Computational Intelligence (SSCI), Dec. 6, 2016, pp. 1-8.

Bernard Schmidt, et al., Depth camera based collison avoidance via active robot control, Journal of Manufacturing Systems, vol. 33, No. 4, Oct. 1, 2014, pp. 711-718.

European Search Report, Patent Application No. PCT/US2019/048520, dated May 16, 2022, 12 pages.

* cited by examiner

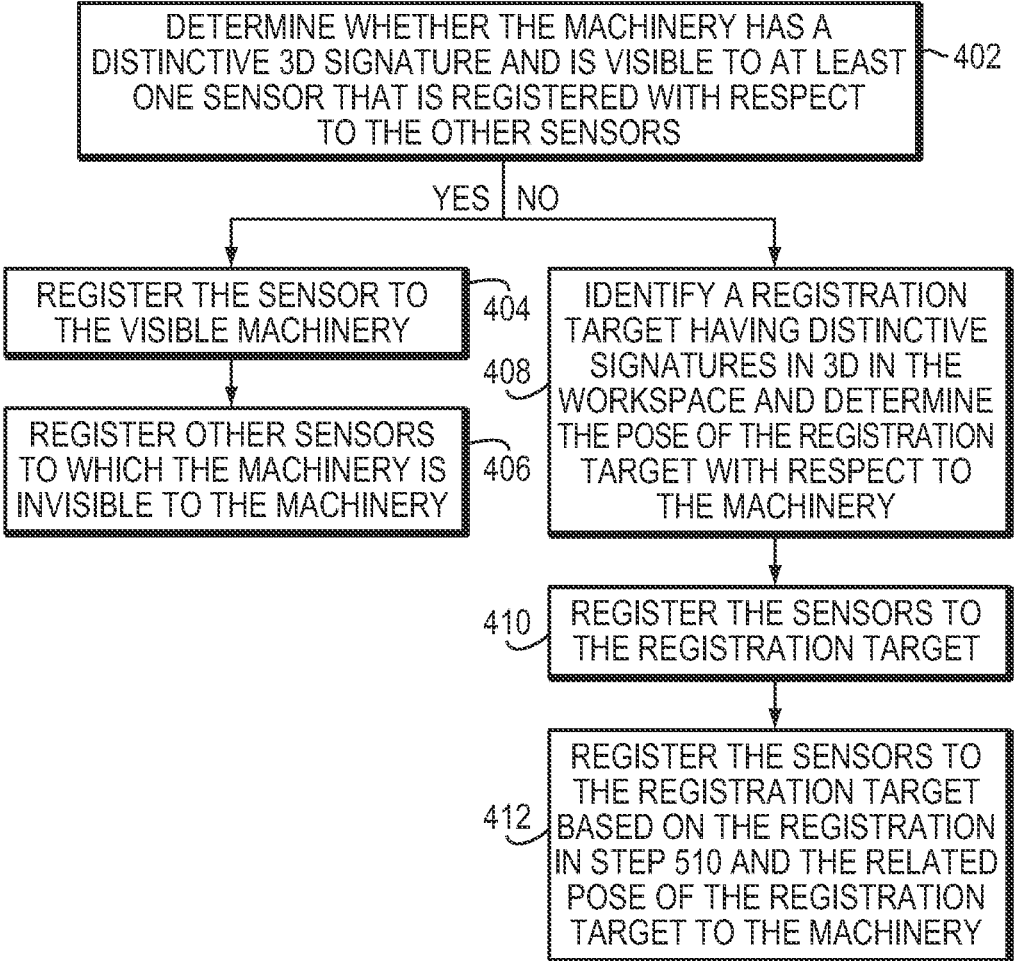

DETERMINE WHETHER THE MACHINERY HAS A DISTINCTIVE 3D SIGNATURE AND IS VISIBLE TO AT LEAST ONE SENSOR THAT IS REGISTERED WITH RESPECT TO THE OTHER SENSORS — 402

YES | NO

REGISTER THE SENSOR TO THE VISIBLE MACHINERY — 404

REGISTER OTHER SENSORS TO WHICH THE MACHINERY IS INVISIBLE TO THE MACHINERY — 406

408 — IDENTIFY A REGISTRATION TARGET HAVING DISTINCTIVE SIGNATURES IN 3D IN THE WORKSPACE AND DETERMINE THE POSE OF THE REGISTRATION TARGET WITH RESPECT TO THE MACHINERY

410 — REGISTER THE SENSORS TO THE REGISTRATION TARGET

412 — REGISTER THE SENSORS TO THE REGISTRATION TARGET BASED ON THE REGISTRATION IN STEP 510 AND THE RELATED POSE OF THE REGISTRATION TARGET TO THE MACHINERY

FIG. 4A

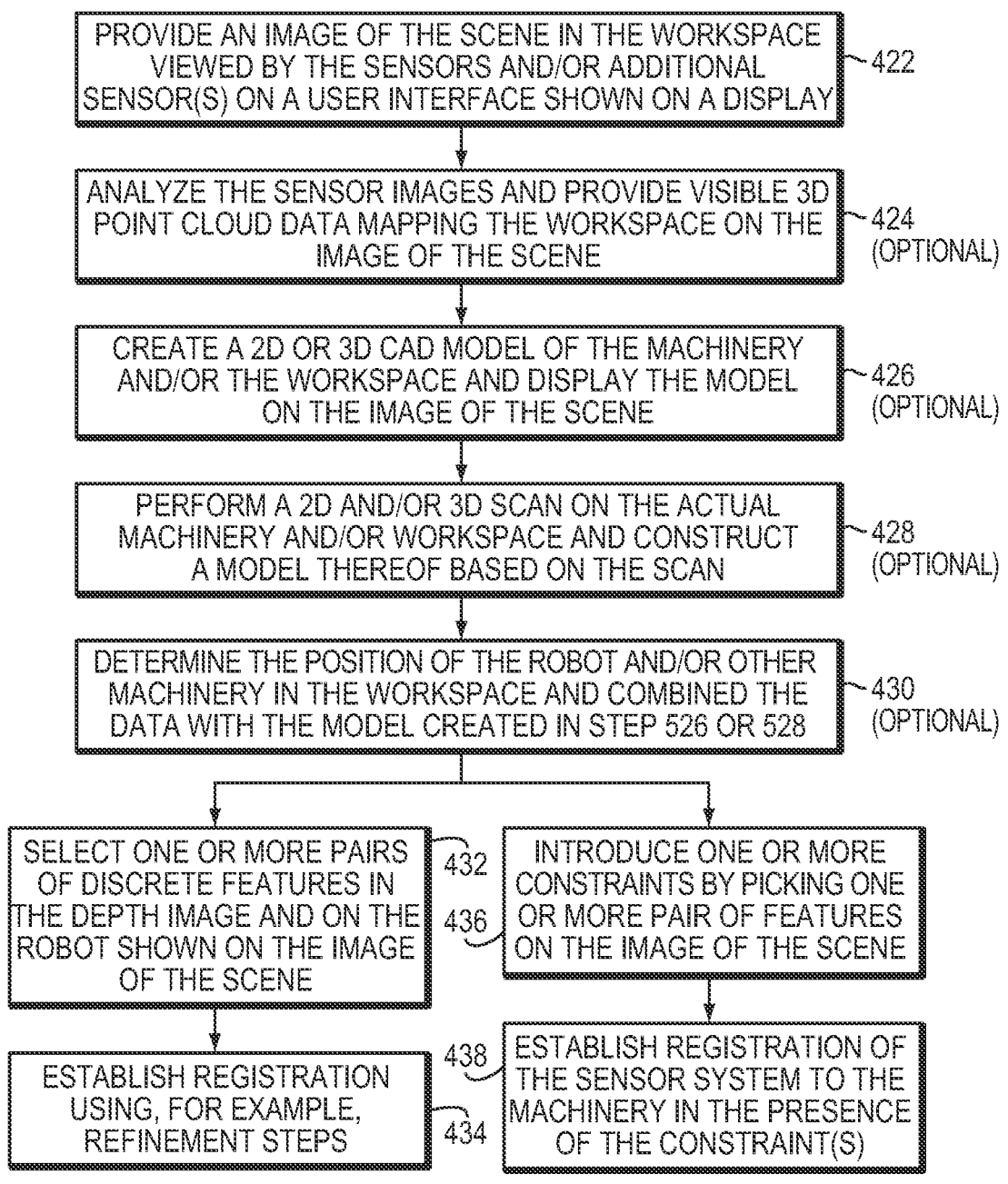

PROVIDE AN IMAGE OF THE SCENE IN THE WORKSPACE VIEWED BY THE SENSORS AND/OR ADDITIONAL SENSOR(S) ON A USER INTERFACE SHOWN ON A DISPLAY ~422

ANALYZE THE SENSOR IMAGES AND PROVIDE VISIBLE 3D POINT CLOUD DATA MAPPING THE WORKSPACE ON THE IMAGE OF THE SCENE ~424 (OPTIONAL)

CREATE A 2D OR 3D CAD MODEL OF THE MACHINERY AND/OR THE WORKSPACE AND DISPLAY THE MODEL ON THE IMAGE OF THE SCENE ~426 (OPTIONAL)

PERFORM A 2D AND/OR 3D SCAN ON THE ACTUAL MACHINERY AND/OR WORKSPACE AND CONSTRUCT A MODEL THEREOF BASED ON THE SCAN ~428 (OPTIONAL)

DETERMINE THE POSITION OF THE ROBOT AND/OR OTHER MACHINERY IN THE WORKSPACE AND COMBINED THE DATA WITH THE MODEL CREATED IN STEP 526 OR 528 ~430 (OPTIONAL)

SELECT ONE OR MORE PAIRS OF DISCRETE FEATURES IN THE DEPTH IMAGE AND ON THE ROBOT SHOWN ON THE IMAGE OF THE SCENE 432

INTRODUCE ONE OR MORE CONSTRAINTS BY PICKING ONE OR MORE PAIR OF FEATURES ON THE IMAGE OF THE SCENE 436

ESTABLISH REGISTRATION USING, FOR EXAMPLE, REFINEMENT STEPS 434

ESTABLISH REGISTRATION OF THE SENSOR SYSTEM TO THE MACHINERY IN THE PRESENCE OF THE CONSTRAINT(S) 438

FIG. 4B

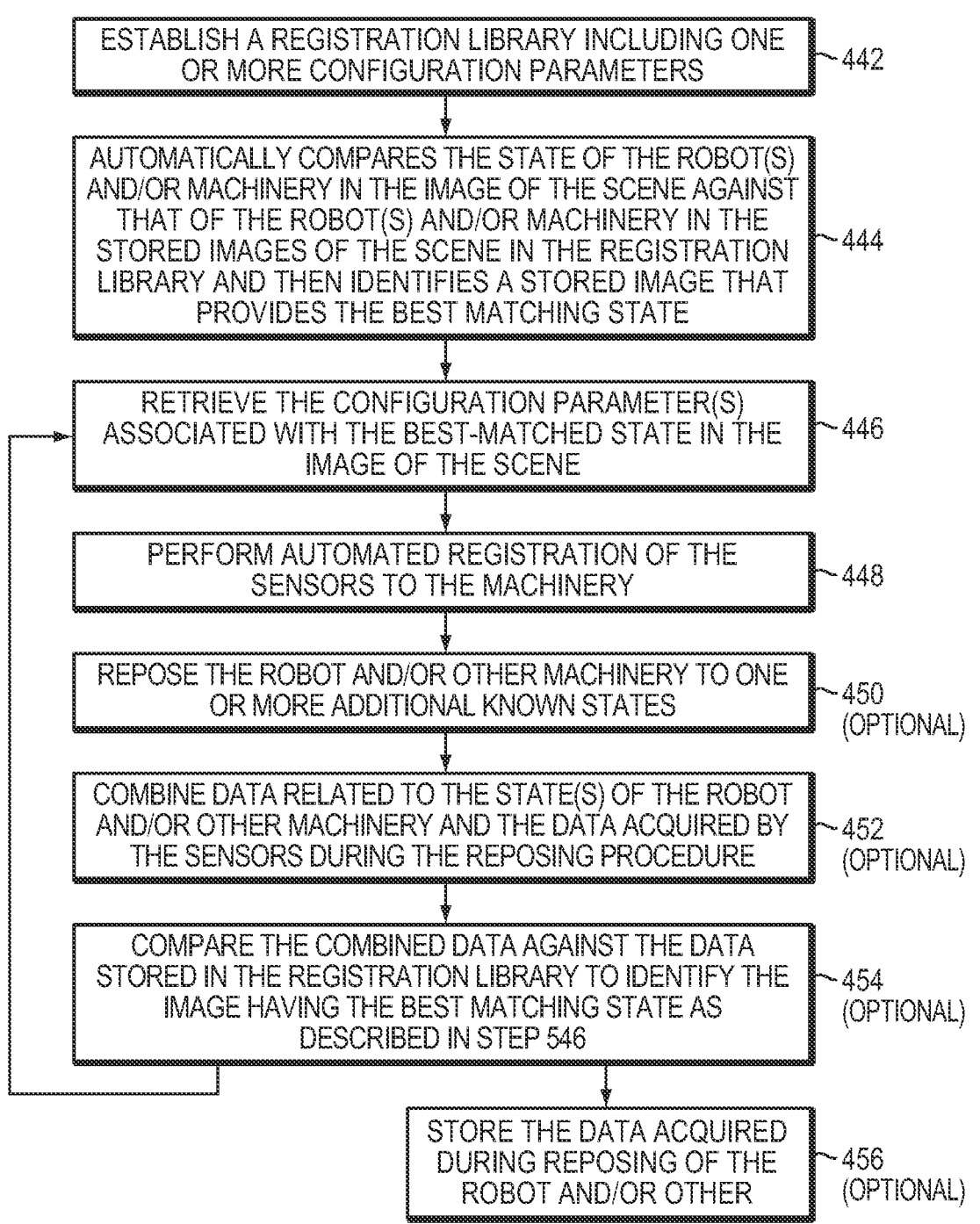

ESTABLISH A REGISTRATION LIBRARY INCLUDING ONE OR MORE CONFIGURATION PARAMETERS ~442

AUTOMATICALLY COMPARES THE STATE OF THE ROBOT(S) AND/OR MACHINERY IN THE IMAGE OF THE SCENE AGAINST THAT OF THE ROBOT(S) AND/OR MACHINERY IN THE STORED IMAGES OF THE SCENE IN THE REGISTRATION LIBRARY AND THEN IDENTIFIES A STORED IMAGE THAT PROVIDES THE BEST MATCHING STATE ~444

RETRIEVE THE CONFIGURATION PARAMETER(S) ASSOCIATED WITH THE BEST-MATCHED STATE IN THE IMAGE OF THE SCENE ~446

PERFORM AUTOMATED REGISTRATION OF THE SENSORS TO THE MACHINERY ~448

REPOSE THE ROBOT AND/OR OTHER MACHINERY TO ONE OR MORE ADDITIONAL KNOWN STATES ~450 (OPTIONAL)

COMBINE DATA RELATED TO THE STATE(S) OF THE ROBOT AND/OR OTHER MACHINERY AND THE DATA ACQUIRED BY THE SENSORS DURING THE REPOSING PROCEDURE ~452 (OPTIONAL)

COMPARE THE COMBINED DATA AGAINST THE DATA STORED IN THE REGISTRATION LIBRARY TO IDENTIFY THE IMAGE HAVING THE BEST MATCHING STATE AS DESCRIBED IN STEP 546 ~454 (OPTIONAL)

STORE THE DATA ACQUIRED DURING REPOSING OF THE ROBOT AND/OR OTHER ~456 (OPTIONAL)

FIG. 4C

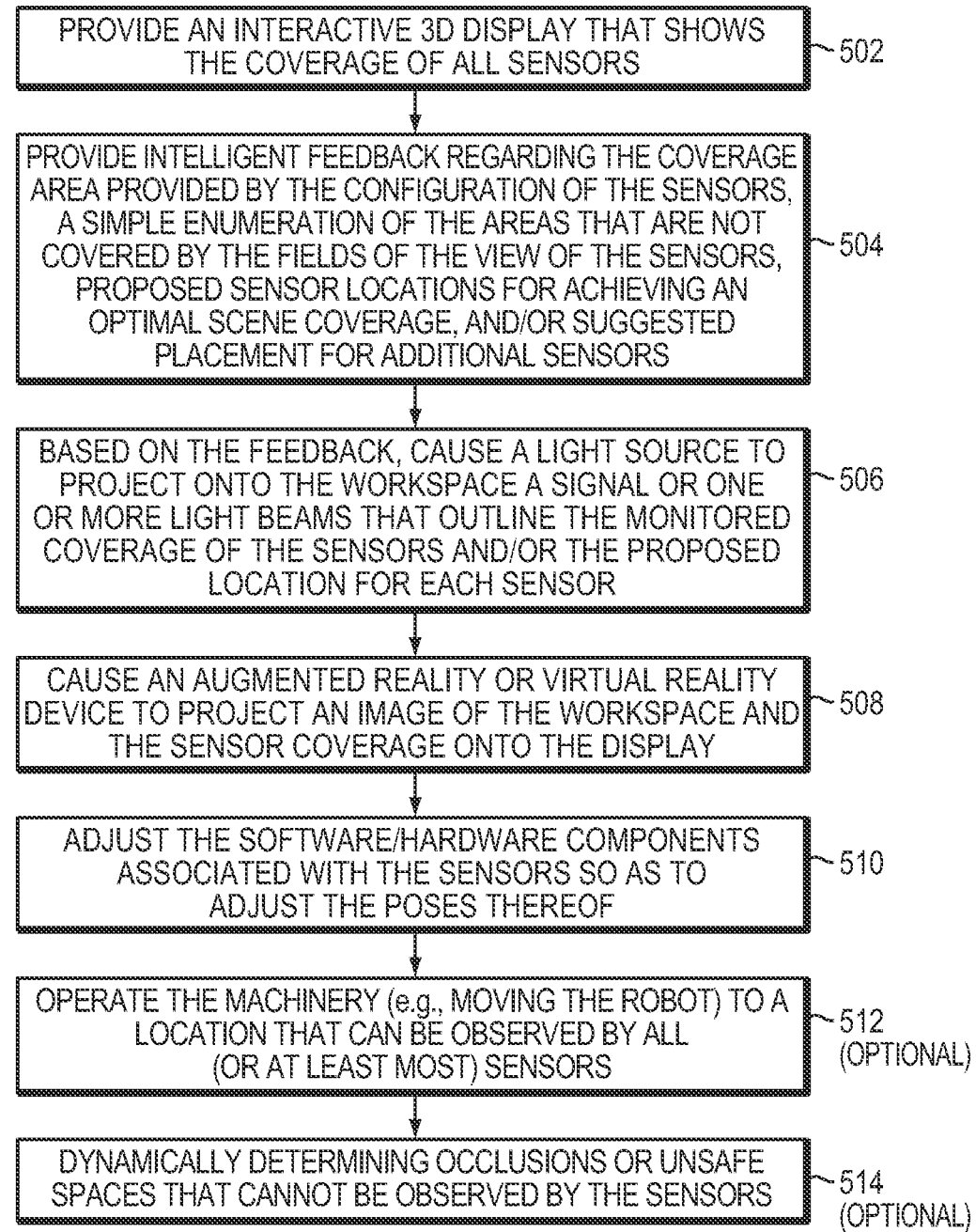

PROVIDE AN INTERACTIVE 3D DISPLAY THAT SHOWS THE COVERAGE OF ALL SENSORS ~502

PROVIDE INTELLIGENT FEEDBACK REGARDING THE COVERAGE AREA PROVIDED BY THE CONFIGURATION OF THE SENSORS, A SIMPLE ENUMERATION OF THE AREAS THAT ARE NOT COVERED BY THE FIELDS OF THE VIEW OF THE SENSORS, PROPOSED SENSOR LOCATIONS FOR ACHIEVING AN OPTIMAL SCENE COVERAGE, AND/OR SUGGESTED PLACEMENT FOR ADDITIONAL SENSORS ~504

BASED ON THE FEEDBACK, CAUSE A LIGHT SOURCE TO PROJECT ONTO THE WORKSPACE A SIGNAL OR ONE OR MORE LIGHT BEAMS THAT OUTLINE THE MONITORED COVERAGE OF THE SENSORS AND/OR THE PROPOSED LOCATION FOR EACH SENSOR ~506

CAUSE AN AUGMENTED REALITY OR VIRTUAL REALITY DEVICE TO PROJECT AN IMAGE OF THE WORKSPACE AND THE SENSOR COVERAGE ONTO THE DISPLAY ~508

ADJUST THE SOFTWARE/HARDWARE COMPONENTS ASSOCIATED WITH THE SENSORS SO AS TO ADJUST THE POSES THEREOF ~510

OPERATE THE MACHINERY (e.g., MOVING THE ROBOT) TO A LOCATION THAT CAN BE OBSERVED BY ALL (OR AT LEAST MOST) SENSORS ~512 (OPTIONAL)

DYNAMICALLY DETERMINING OCCLUSIONS OR UNSAFE SPACES THAT CANNOT BE OBSERVED BY THE SENSORS ~514 (OPTIONAL)

FIG. 5A

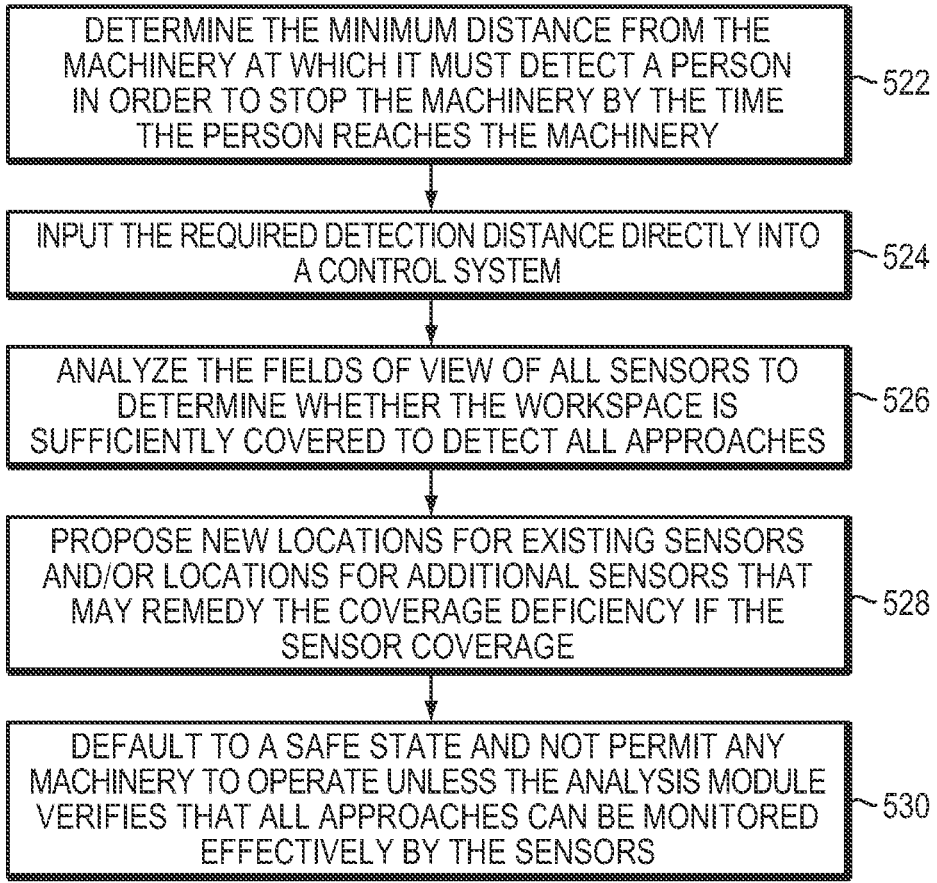

DETERMINE THE MINIMUM DISTANCE FROM THE MACHINERY AT WHICH IT MUST DETECT A PERSON IN ORDER TO STOP THE MACHINERY BY THE TIME THE PERSON REACHES THE MACHINERY ~522

INPUT THE REQUIRED DETECTION DISTANCE DIRECTLY INTO A CONTROL SYSTEM ~524

ANALYZE THE FIELDS OF VIEW OF ALL SENSORS TO DETERMINE WHETHER THE WORKSPACE IS SUFFICIENTLY COVERED TO DETECT ALL APPROACHES ~526

PROPOSE NEW LOCATIONS FOR EXISTING SENSORS AND/OR LOCATIONS FOR ADDITIONAL SENSORS THAT MAY REMEDY THE COVERAGE DEFICIENCY IF THE SENSOR COVERAGE ~528

DEFAULT TO A SAFE STATE AND NOT PERMIT ANY MACHINERY TO OPERATE UNLESS THE ANALYSIS MODULE VERIFIES THAT ALL APPROACHES CAN BE MONITORED EFFECTIVELY BY THE SENSORS ~530

FIG. 5B

SYSTEMS AND METHODS FOR INFORMATION-ASSISTED SENSOR REGISTRATION

RELATED APPLICATIONS

This is a continuation-in-part of U.S. Ser. No. 17/412,912, filed on Aug. 26, 2021, which is itself a continuation of U.S. Ser. No. 16/553,738, filed on Aug. 28, 2019, now U.S. Pat. No. 11,156,981, which claims the benefit of and priority to U.S. Ser. No. 62/724,945, filed on Aug. 30, 2018. The entire disclosures of the foregoing priority documents are hereby incorporated by reference.

TECHNICAL FIELD

The present invention relates, in general, to sensors in a three-dimensional (3D) space, and, in particular, to systems and methods for performing automatic estimation of a sensor's position and orientation in 3D space.

BACKGROUND

Industrial machinery is often dangerous to humans. Some machinery is dangerous unless it is completely shut down, while other machinery may have a variety of operating states, some of which are hazardous and some of which are not. In some cases, the degree of hazard may depend on the location or distance of the human with respect to the machinery. As a result, various types of "guarding" equipment have been developed to separate humans and machines, thereby preventing machinery from causing harm to humans. One very simple and common type of guarding is a cage that surrounds the machinery, configured such that opening the door of the cage causes an electrical circuit to place the machinery in a safe state (e.g., shutting down the machinery). This ensures that humans can never approach the machinery while it is operating in an unsafe state.

More sophisticated types of guarding may involve, for example, optical sensors. Examples include light curtains that determine if any object has intruded into a region monitored by one or more light emitters and detectors, and two-dimensional (2D) LIDAR sensors that use active optical sensing to detect the minimum distance to an obstacle along a series of rays emanating from the sensors (and thus can be configured to detect either proximity or intrusion into pre-configured 2D zones). In addition, 3D depth sensors have been recently employed in various machine-guarding applications for providing guarding improvement. Examples of the 3D depth sensors include 3D time-of-flight cameras, 3D LIDAR, and stereo vision cameras. These sensors offer the ability to detect and locate intrusions into the area surrounding industrial machinery in 3D, which gives them several advantages over 2D sensors. For example, a 2D LIDAR system guarding the floorspace around an industrial robot will have to stop the robot when an intrusion is detected well over an arm's-length distance away from the robot, because if the intrusion represents a person's legs, that person's arms could be much closer and would be undetectable by the 2D LIDAR. However, a 3D system can allow the robot to continue to operate until the person actually stretches his or her arm towards the robot. This allows for a much tighter coupling between the actions of the machine and the actions of the human, which provides flexibility in many applications and saves space on the factory floor, which is always at a premium.

Because human safety is at stake, guarding equipment (particularly the electronic versions) must comply with stringent industry standards regarding functional safety, such as IEC 61508 and ISO 13849. These standards specify failure rates for hardware components and rigorous development practices for both hardware and software components; a system is considered safe for use in an industrial setting only when the hardware and software components comply with the standards. Standards-compliant systems must ensure that dangerous conditions and system failures can be detected with very high probability, and that the system responds to such events by transitioning the equipment being controlled into a safe state. For example, safety systems may be tuned to favor false positives over false negatives in order to avoid hazardous consequences resulting from the false negatives.

Separation of humans and machines, however, is not always optimal for productivity. For example, some tasks are best performed by a human and machine working collaboratively; machines typically provide more strength, faster speed, more precision, and more repeatability, while humans may offer flexibility, dexterity, and judgment far beyond the abilities of even the most advanced machines. An example of a potential collaborative application is the installation of a dashboard in a car—the dashboard is heavy and difficult for a human to maneuver but easy for a machine, and attaching it requires a variety of connectors and fasteners that require human dexterity and flexibility to handle correctly. Conventional guarding technology, however, is insufficiently flexible and adaptable to allow this type of collaboration. Therefore, these situations are typically resolved either by automating aspects of the task best performed by a human, often at great expense and complication, or using a human worker to perform aspects of the task better done by a robot (perhaps using additional equipment such as lift-assist devices) and tolerating potentially slow, error-prone, and inefficient execution that may lead to repetitive stress injuries or exposure to hazardous situations for human workers.

Although improved guarding based on 3D sensing may enable industrial engineers to design processes where each subset of the task is optimally assigned to a human or a machine without sacrificing the safety of human workers, several challenges inherently exist in using the 3D sensors in a safety-critical environment. First, the sensor itself must meet functional safety standards. In addition, the raw output of a 3D sensor cannot be used directly in most applications since it is much richer and harder to analyze than the data provided by 2D sensors. 3D sensor data thus requires processing in novel ways to generate effective and reliable control outputs for industrial machinery. Another challenge with systems based on 3D data is the difficulty in configuring and registering the systems and 3D sensors. In fact, even with 2D sensors, configuring safety guarding can be challenging. First, specific zones are usually designed and configured for each use case, taking into account the specific hazards posed by the machinery, the possible actions of humans in the workspace, the workspace layout, and the location and field of view of each individual sensor. It can be difficult to calculate the optimal shapes of exclusion zones, especially when trying to preserve safety while maximizing available floor space and system throughput.

Thus, configuring guarding technology requires advanced skill sets or tools. Mistakes in the configuration can result in serious safety hazards, requiring significant overhead in design and testing. All of this work must be completely redone if any changes are made to the workspace. The extra degree of freedom presented by 3D systems/sensors results in a much larger set of possible configurations and hazards, thereby requiring higher levels of data processing in order to generate useful, reliable control outputs from raw 3D sensor data. Accordingly, there is a need for approaches that reliably monitor a workspace for providing human safety to operate around the machinery, while reducing the required processing time and complexity of the data acquired by the 3D sensors.

SUMMARY

Various embodiments of the present invention provide systems and methods for monitoring a workspace for safety purposes using 3D sensors that are registered with respect to each other and with respect to one or more pieces of machinery under control. As used herein, the term "register" refers to the process of estimating the relative pose of an object (e.g., a sensor) with respect to one or more other objects (e.g., a robot, the floor, other sensors, etc.). The goal of "registration" is to specify this relationship in terms of a rigid-body transformation with respect to a reference frame.

Registration among the sensors may be established based on one or more 3D images of the workspace acquired by the sensors when there is sufficient overlap and/or distinction between the acquired images. For example, conventional computer-vision techniques (e.g., global registration algorithms) and a fine registration approach (e.g., an ICP algorithm) may be implemented to perform registration among the sensors. If there is insufficient overlap between the fields of the sensors and/or insufficient details in the workspace are provided in the acquired images, one or more registration objects having distinctive signatures in 3D may be utilized for sensor registration. Alternatively, each sensor may record images of one or more people, moving equipment or other registration object(s) standing in the workspace or passing throughout the workspace over a period of time; when a sufficient number of at least partially matching images are acquired, the images may be combined and processed to establish the sensor registration. After the sensor registration is complete, a common reference frame of the sensors may then be transformed to a global reference frame of the workspace such that the data acquired by the sensor can be processed in the global frame.

In various embodiments, after the sensors are registered among themselves, the sensors are registered to machinery in the workspace. The registration can be established using the machinery and/or a registration target having a distinctive 3D signature and a related pose with respect to the machinery. The object used as a registration target may have on or in proximity thereto a source of information specifying the location of the object, the pose of the object, or both. For example, this information may be machine-readable by optical capture (e.g., a barcode) or using a reader (such as a reader that acquires information from an RFID tag affixed to or near the registration object).

In one approach, the sensors may first register to registration target using the acquired information; and then based on this registration and the related pose of the registration target to the machinery, the sensors may register to the machinery. In some embodiments, an image of the scene in the workspace viewed by the sensors is provided on a user interface. In addition, a 2D or 3D model of the machinery and/or the workspace created using computer-aided design (CAD) and/or scanning of the actual machinery and/or workspace may be displayed on the image of the scene. One or more pairs of discrete features and/or constraints in the image of scene may then be selected manually by the operator or automatically by a control system to establish the registration between the sensors and the machinery. In various embodiments, automated registration of the sensors to the machinery involves use of a registration library including one or more configuration parameters (e.g., a number of iterations for fine-tuning the registration, a 3D point cloud density, mesh density, one or more convergence criteria, etc.) that are established in previous setups of the sensors and machinery in the workspace. In one embodiment, the state of the robot(s) and/or machinery in the image of the scene is compared against that of the robot(s) and/or machinery in the stored images of the scene in the registration library; an image that provides the best matching state in the registration library can be identified. Subsequently, the configuration parameter(s) associated with the best-matched state in the image of the scene can be retrieved, and based thereon, registration of the sensors to the machinery may be established.

During operation of the machinery, registration among sensors and between the sensors and machinery can be continuously monitored in real time. For example, a set of metrics (e.g., registration validation, real-time robot tracking, etc.) capturing the fit accuracy of the observed data to a model of static elements in the workspace may be created during the registration process. Upon completion of the registration and as the system operates, the metrics may be continuously monitored and updated in real time. If the metrics or deviations thereof from their initial values (i.e., obtained during initial registration) exceed a specified threshold, the registration during the system operation may be considered to be invalid and an error condition may be triggered. Subsequently, the machinery under operation may be shut down or transitioned to a safe state. In addition, the signals acquired by the sensors during operation of the machinery may be continuously analyzed. If the sensors remain in position but the fields of view are obscured or blocked, and/or the measured sensor signals are degraded, the machinery may be transitioned to a safe state as well. Accordingly, various embodiments provide approaches that reliably monitor the workspace for providing human safety to operate around the machinery.

Accordingly, in one aspect, the invention relates to a method of ensuring safe operation of industrial machinery in a workcell, which includes at least one object having on or in proximity thereto a source of information specifying at least one of a location of the object or a pose of the object. In various embodiments, the method comprises the steps of disposing a plurality of image sensors proximate to the workcell and acquiring, with at least some of the image sensors, a plurality of images of the workcell; acquiring at least one of location or pose information of at least one object in the workcell appearing in at least one of the images; and registering the sensors to each other and to the workcell based at least in part on the plurality of images and the acquired information.

In some embodiments, the information is acquired by a first one of the sensors and propagated electronically to the other sensors. The information may be optical (e.g., a barcode) and detected by at least one of the sensors along a line of sight. Alternatively, or in addition, the information may be electromagnetic. For example, the source of information may be passive (e.g., an RFID tag or a retroreflective tag) and the information may be detected by at least one reader emitting electromagnetic energy. Alternatively, the source of information emits an electromagnetic signal for detection by at least one reader. The electromagnetic signal may, for example, be optical or radiofrequency.

In another aspect, the invention pertains to a registration object for facilitating registration among sensors distributed about a workspace. In various embodiments, the registration object comprises a body portion including at least one asymmetric feature; and affixed or in close proximity to the body portion, a source of optically or electronically readable information specifying a location and a pose of the object. The information may be detectable by an optical sensor along a line of sight, e.g., it may be a barcode. Alternatively, or in addition, the information may be detectable by at least one reader emitting electromagnetic energy, and the source of information may be responsive to an interrogation signal; e.g., the source of information may be a passive RFID tag or a retroreflective tag. In some cases, the source of information may emit an electromagnetic signal for detection by at least one reader.

As used herein, the term "substantially" means ±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIGS. 4A-4C are flow charts illustrating exemplary approaches for registering one or more sensors to machinery in a workspace in accordance with various embodiments of the present invention;

FIGS. 5A and 5B are flow charts illustrating exemplary approaches for configuring sensors to appropriately cover a scene in a workspace in accordance with various embodiments of the present invention.

DETAILED DESCRIPTION

A. Workspace

Figure 1:
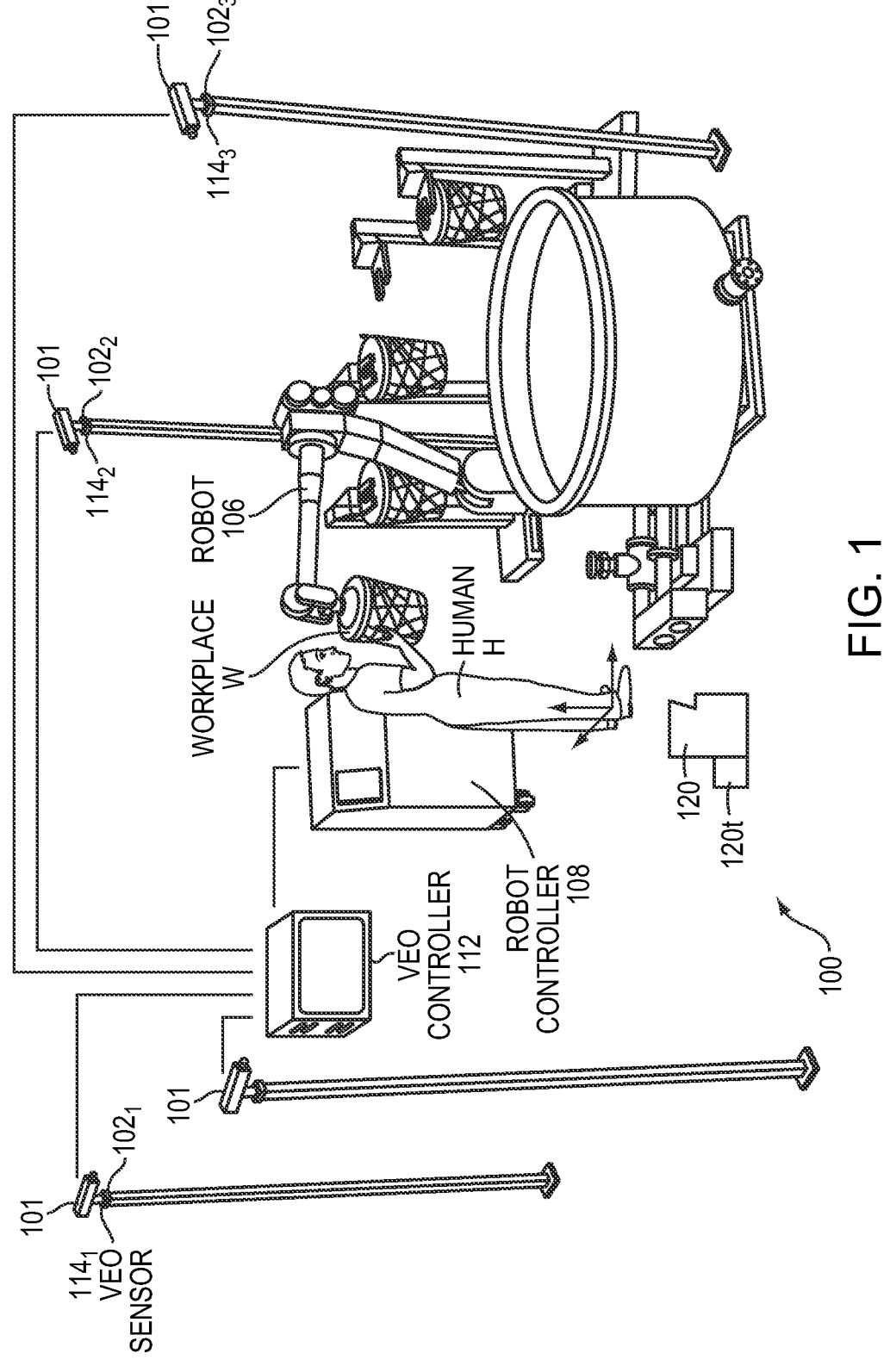
FIG. 1 is a perspective view of a monitored workspace in accordance with various embodiments of the present invention.

Refer first to FIG. 1, which illustrates a representative 3D workspace 100 monitored by a sensor system 101 including one or more sensors representatively indicated at $102_1$, $102_2$, $102_3$. The sensors $102_{1-3}$ may be conventional optical sensors such as cameras, e.g., 3D time-of-flight cameras, stereo vision cameras, or 3D LIDAR sensors or radar-based sensors, ideally with high frame rates (e.g., between 30 Hz and 100 Hz). The mode of operation of the sensors $102_{1-3}$ is not critical so long as a 3D representation of the workspace 100 is obtainable from images or other data obtained by the sensors $102_{1-3}$. As shown in the figure, sensors $102_{1-3}$ may collectively cover and can monitor the workspace 100, which includes a robot 106 controlled by a conventional robot controller 108. The robot 106 interacts with various workpieces W, and a human operator H in the workspace 100 may interact with the workpieces W and the robot 106 to perform a task. The workspace 100 may also contain various items of auxiliary equipment 110. As used herein the robot 106 and auxiliary equipment 110 are denoted as machinery in the workspace 100.

In various embodiments, data obtained by each of the sensors $102_{1-3}$ is transmitted to a control system 112. In addition, the sensors $102_{1-3}$ may be supported by various software and/or hardware components $114_{1-3}$ for changing the configurations (e.g., orientations and/or positions) of the sensors $102_{1-3}$; as further described below, the control system 112 may be configured to adjust the sensors so as to provide optimal coverage of the monitored area in the workspace 100. The volume of space covered by each sensor—typically a solid truncated pyramid or solid frustum—may be represented in any suitable fashion, e.g., the space may be divided into a 3D grid of small (5 cm, for example) cubes or "voxels" or other suitable form of volumetric representation. For example, a 3D representation of the workspace 100 may be generated using 2D or 3D ray tracing, where the intersections of the 2D or 3D rays emanating from the sensors $102_{1-3}$ are used as the volume coordinates of the workspace 100. This ray tracing can be performed dynamically or via the use of precomputed volumes, where objects in the workspace 100 are previously identified and captured by the control system 112. For convenience of presentation, the ensuing discussion assumes a voxel representation, and the control system 112 maintains an internal representation of the workspace 100 at the voxel level.

Figure 2:
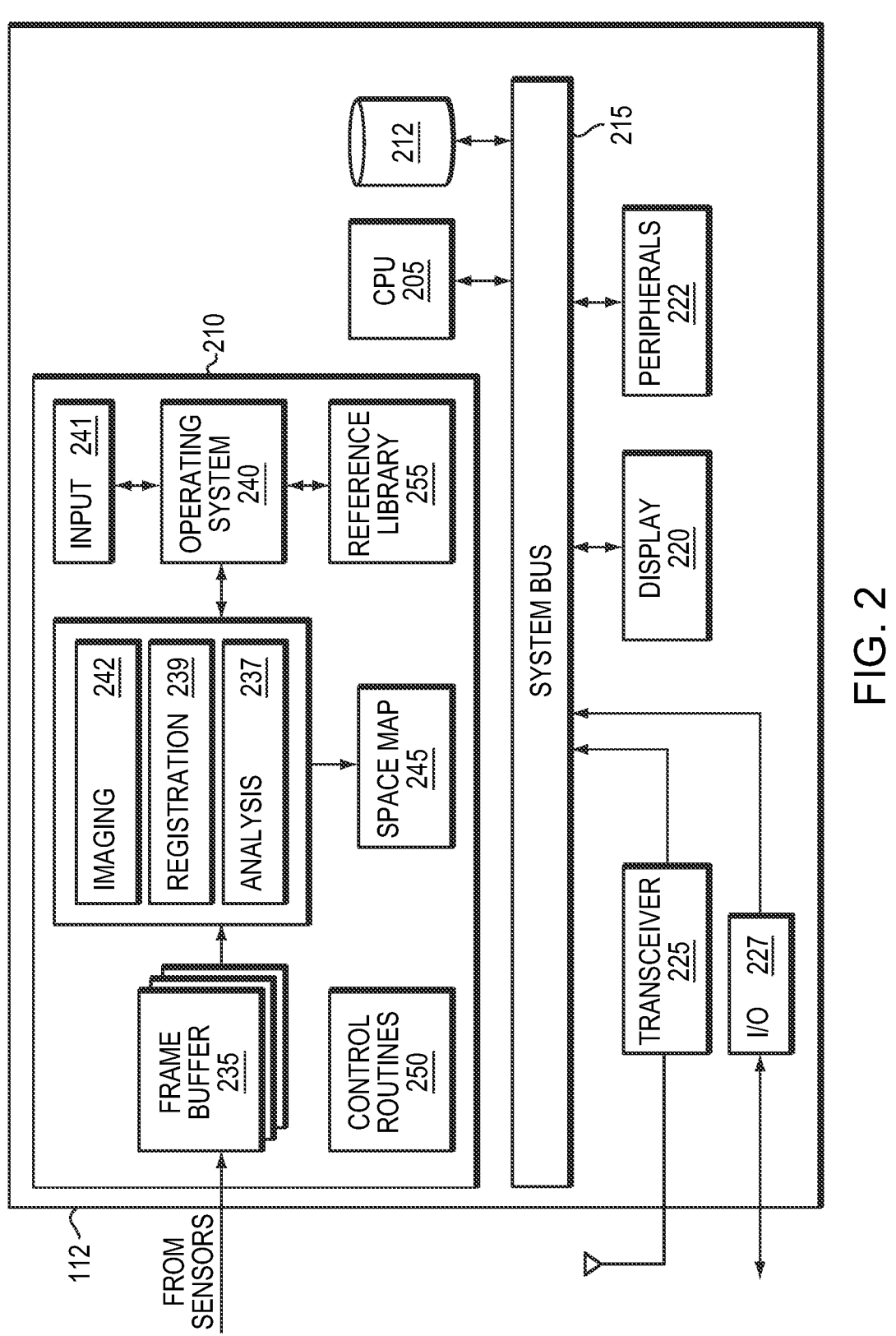
FIG. 2 schematically illustrates a control system in accordance with various embodiments of the present invention.

FIG. 2 illustrates, in greater detail, a representative embodiment of the control system 112, which may be implemented on a general-purpose computer. The control system 112 includes a central processing unit (CPU) 205, system memory 210, and one or more non-volatile mass storage devices (such as one or more hard disks and/or optical storage units) 212. The control system 112 further includes a bidirectional system bus 215 over which the CPU 205, functional modules in the memory 210, and storage device 212 communicate with each other as well as with internal or external input/output (I/O) devices, such as a display 220 and peripherals 222 (which may include traditional input devices such as a keyboard or a mouse). The control system 112 also includes a wireless transceiver 225 and one or more I/O ports 227. The transceiver 225 and I/O ports 227 may provide a network interface. The term "network" is herein used broadly to connote wired or wireless networks of computers or telecommunications devices (such as wired or wireless telephones, tablets, etc.). For example, a computer network may be a local area network (LAN) or a wide area network (WAN). When used in a LAN networking environment, computers may be connected to the LAN through a network interface or adapter; for example, a supervisor may establish communication with the control system 112 using a tablet that wirelessly joins the network. When used in a WAN networking environment, computers typically include a modem or other communication mechanism. Modems may be internal or external and may be connected to the system bus via the user-input interface, or other appropriate mechanism. Networked computers may be connected over the Internet, an Intranet, Extranet, Ethernet, or any other system that provides communications. Some suitable communications protocols include TCP/IP, UDP, or OSI, for example. For wireless communications, communications protocols may include IEEE 802.11x ("Wi-Fi"), Bluetooth, ZigBee, IrDa, near-field communication (NFC), or other suitable protocol. Furthermore, components of the system may communicate through a combination of wired or wireless paths, and communication may involve both computer and telecommunications networks.

The CPU 205 is typically a microprocessor, but in various embodiments may be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), PLD (programmable logic device), PLA (programmable logic array), RFID processor, graphics processing unit (GPU), smart chip, or any other device or arrangement of devices that is capable of implementing the steps of the processes of the invention.

The system memory 210 may contain a series of frame buffers 235, i.e., partitions that store, in digital form (e.g., as pixels or voxels, or as depth maps), images obtained by the sensors $102_{1-3}$; the data may actually arrive via I/O ports 227 and/or transceiver 225 as discussed above. The system memory 210 contains instructions, conceptually illustrated as a group of modules, that control the operation of CPU 205 and its interaction with the other hardware components. An operating system 240 (e.g., Windows or Linux) directs the execution of low-level, basic system functions such as memory allocation, file management and operation of the mass storage device 212. At a higher level, and as described in greater detail below, an imaging module 242 may register the images acquired by the sensors in the frame buffers 235; an analysis module 237 may analyze the images acquired by the sensors $102_{1-3}$ to determine, for example, whether there is sufficient overlap and/or distinction between the acquired images and/or the coverage area monitored by the sensors $102_{1-3}$; a registration module 239 may register the sensors among themselves based on the images registered in the frame buffers 235 and/or register the sensors $102_{1-3}$ to the machinery in the workspace as further described below; and an input module 241 for receiving one or more external input data from, for example, the display 220, the peripherals 222, the robot controller 108 and/or additional sensors (e.g., other than the sensors $102_{1-3}$) for identifying a state (e.g., an orientation, a position, etc.) of the robot 106 and/or one or more registration objects as further described below. The determined coverage area may be stored in a space map 245, which contains a volumetric representation of the workspace 100 with each voxel (or other unit of representation) labeled, within the space map, as described herein. Alternatively, the space map 245 may simply be a 3D array of voxels, with voxel labels being stored in a separate database (in memory 210 or in mass storage 212).

In addition, the control system 112 may communicate with the robot controller 108 to control the operation or machinery in the workspace 100 using conventional control routines collectively indicated at 250. As explained below, the configuration of the workspace may well change over time as persons and/or machines move about; the control routines 250 may be responsive to these changes in operating machinery to achieve high levels of safety. All of the modules in system memory 210 may be coded in any suitable programming language, including, without limitation, high-level languages such as C, C++, C#, Java, Python, Ruby, Scala, and Lua, utilizing, without limitation, any suitable frameworks and libraries such as TensorFlow, Keras, PyTorch, or Theano. Additionally, the software can be implemented in an assembly language and/or machine language directed to the microprocessor resident on a target device B. Sensor Registration and Monitoring The sensor system 101 is implemented to monitor the workspace 100, and the guarding mechanism is generally configured with respect to dangerous machinery (e.g., the robot 106), as opposed to the sensors $102_{1-3}$. In a multi-sensor system, a registration among the sensors $102_{1-3}$ that correlates the precise location of each sensor 102 with respect to all other sensors is typically established during setup and/or during operation of the machinery. In one embodiment, the sensor registration is performed manually. For example, the human operator H may measure distances between the focal points of the sensors and the machinery being controlled in three dimensions and manually manipulate the poses (e.g., positions and/or orientations) of the sensors $102_{1-3}$ based thereon so as to provide an optimal coverage area in the workspace 100. Additionally, or alternatively, a user interface shown in the display 220 may, for example, provide alignment points of the sensors $102_{1-3}$ and a signal to indicate optimal sensor positioning to maximize signal quality and reliability, determine and display metrics for registration reliability and safety signals, and provide user feedback. The operator H may then adjust the pose of the sensor $102_{1-3}$ based on the user feedback. While it is possible for sensor registration to be achieved manually, it may be burdensome even for a single sensor, and unrealistic for providing sufficiently accurate measurements to combine information from multiple sensors. Therefore, in various embodiments, the sensor registration is performed automatically using suitable computer-vision techniques. As further described below, approaches for registering multiple sensors $102_{1-3}$ in the workspace 100 are sufficiently simple so as to allow for ease of setup and reconfiguration.

1) Registration Among Sensors

Assuming for simplicity that each frame buffer 235 stores an image (which may be refreshed periodically) from a particular sensor 102, the registration module 239 may perform registration among the sensors $102_{1-3}$ by comparing all or part of the image from each sensor to the images from other sensors in the frame buffers 235, and using conventional computer-vision techniques (e.g., global-registration algorithms) to identify correspondences in those images. Suitable global-registration algorithms, which do not require an initial registration approximation, generally fall into two categories: feature-based methods and intensity-based methods. Feature-based methods, such as random sample consensus (RANSAC), may extract features (e.g., edges) in the images and then identify correspondences based on the extracted image features; intensity-based methods may determine image intensities in the images and then use correlation metrics to compare the intensity patterns. Once an approximate or gross registration is performed, a fine registration approach (e.g., an iterative closest point (ICP) algorithm or suitable variant thereof) may be performed to fine-tune the registration and complete the sensor registration among themselves. Thereafter, the data acquired by the sensors $102_{1-3}$ can be processed in a common reference frame (e.g., in the same coordinate system) based on the registration.

In various embodiments, the common reference frame of the sensors $102_{1-3}$ is transformed to a "global" frame (e.g., a coordinate system) of the workspace 100. For example, to convert the images acquired by the sensors $102_{1-3}$ in a common 2D frame to 3D data in the global frame of the workspace 100, a 2D range image in the frame buffer 235 may be transformed to a sensor-local 3D coordinate system by undistorting the image coordinates of each range pixel and applying an inverse projection transformation to the undistorted image coordinates and a range measurement. This generates a structured point cloud in the sensor-local coordinate system, which may be transformed using a suitable rigid-body transformation. Referring again to FIG. 1, in one embodiment, the transformation is determined using one or more "registration objects" 120 having distinctive visual signatures in 3D. For example, the registration object(s) may be placed in a location within the workspace where it can be seen by all sensors or at least one sensor that is registered with respect to the others. By acquiring images of the registration object(s) using the registered sensor(s) $102_{1-3}$ and based on the known signature(s) and/or geometries of the registration object(s), the transformation that transforms data in the common frame of the sensors $102_{1-3}$ to the data in the global frame of the workspace 100 may be computed. Thereafter, the data acquired by the sensors $102_{1-3}$ can be processed in the global frame of the workspace 100.

The above-described approaches for sensor registration are suitable when there is sufficient overlap between the fields of view of the sensors $102_{1-3}$ and sufficient visual detail in the workspace 100 to provide distinct sensor images. If, however, there is insufficient overlap between the fields of the sensors $102_{1-3}$ and/or insufficient detail in the workspace 100, use of one or more registration objects 120 having distinctive signatures in 3D may be necessary to facilitate sensor registration. For example, each sensor 102 may be first separately registered to the registration object(s); registration among the sensors $102_{1-3}$ may then be established based on the registration between each sensor 102 and the registration object(s) 120. As used herein, the term "distinctive 3D signature" refers to a uniquely identifiable position and pose (and so free of rotational or translational symmetry), e.g., presenting a detectably different profile when viewed from different angles. For example, while a single cube has six potential orientations, two cubes at a known distance and non-collinear orientation with respect to each other may provide sufficient information for a distinctive 3D signature. More generally, the registration object(s) may include, for example, fiducials or other 2D or 3D objects, and may be stationary or carried around by the human operator H and/or machinery (e.g., on the robot) in the guarded workspace 100.

Alternatively, registration among the sensors $102_{1-3}$ may be achieved by having each of the sensors $102_{1-3}$ record images of one or more people, moving equipment (such as automated guided vehicles) or other registration object(s) 120 standing in the workspace or passing through the workspace over a period of time; when a sufficient number of at least partially matching images are acquired, the images may be combined and processed to establish an accurate sensor registration using the approaches described above.

Occasionally, the data collected from the sensors $102_{1-3}$ may be noisy or optically distorted; thus, in some embodiments, suitable techniques, such as sub-frame combination, noise reduction, meshing and resampling, etc. may be implemented to minimize (or at least reduce) the noise inherent in the sensor signals, thereby improving accuracy of sensor registration. In addition, the detected sensor signals may be corrected using conventional approaches based on average or distribution estimation so as to maintain sensor alignment. In one embodiment, the noise and distortion correction process bounds the errors inherent in the detected signals and registration process. The error bounds can be used as inputs to the control system 112 during operation of the robot 106 to ensure human safety. For example, if the noise or distortion of the signals detected by the sensors $102_{1-3}$ during operation of the robot 106 exceeds the error bounds and/or the robotic system drifts outside the error bounds during operation, the control system 112 may automatically communicate with the robot controller 108 so as to switch the machinery in the workspace 100 to a safe state (e.g., having a reduced speed or being deactivated).

In various embodiments, a global-optimization algorithm is implemented to estimate the optimal configuration or pose of each sensor in the coordinate system of the workspace 100 by minimizing a global error metric. The use of a global optimization algorithm ensures the best sensor configuration estimate regardless of the initial configuration or estimates thereof. For example, given a set of correspondences, one common approach is to minimize the sum of pairwise (typically Euclidean) distances. In such cases the cost for optimization purposes is taken as the distance. Other distance-based costs such as "Hausdorff" distance are common for alignment tasks. Where no correspondences can be identified, these may be estimated through refinement of a good guess using nearest neighbor or projections into depth images. Global pose estimation without correspondences is more challenging and the cost function becomes more abstract, e.g., a search for viable poses via branch-and-bound algorithms or sampling of point sets to find minimal functioning correspondence sets using, e.g., the RANSAC algorithm or similar approaches.

Figure 3:
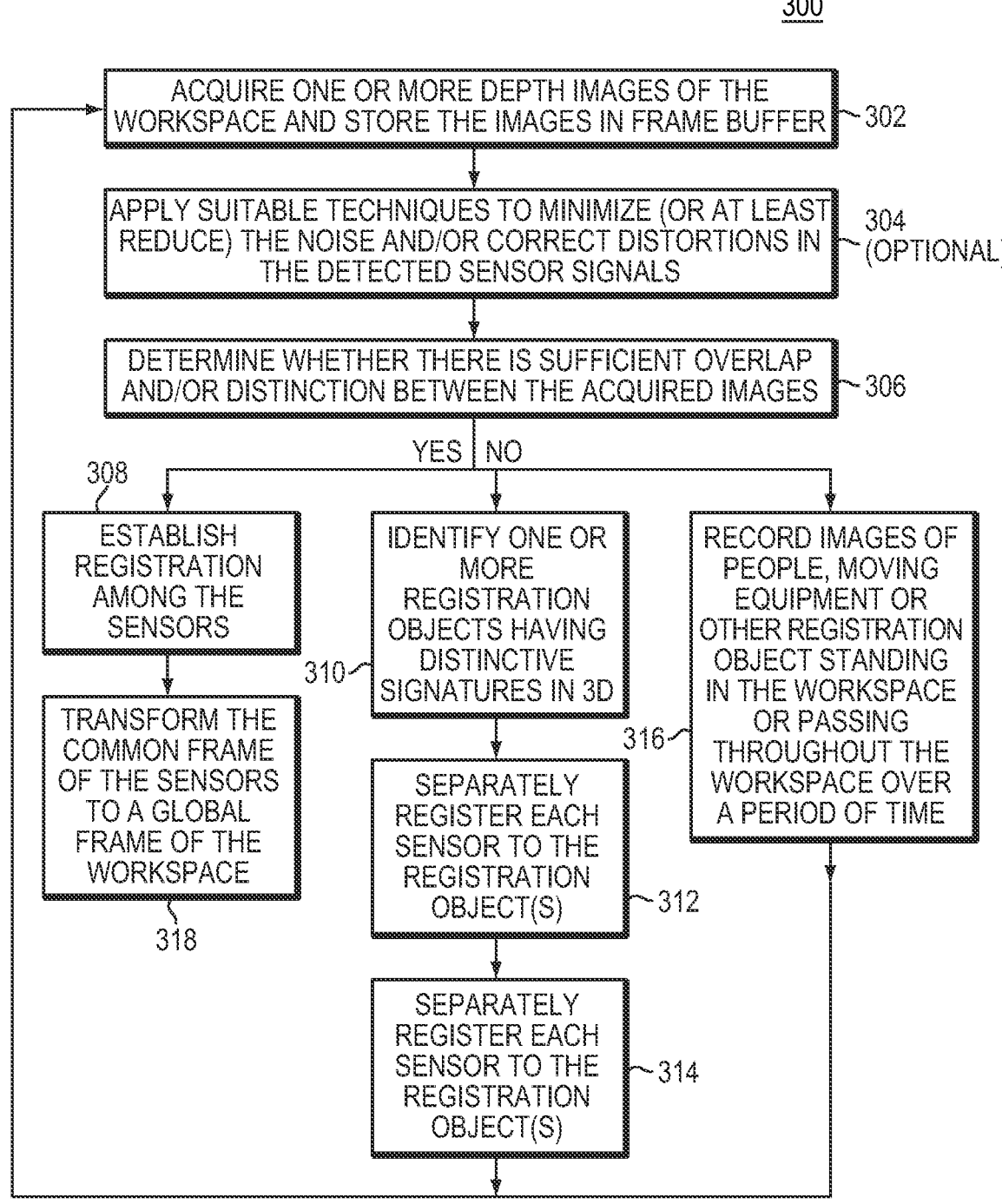
FIG. 3 is a flow chart illustrating an approach for registering sensors among themselves in accordance with various embodiments of the present invention.

FIG. 3 is a flow chart illustrating an exemplary approach 300 for registering sensors among themselves. In a first step 302, each of the sensors $102_{1-3}$ may acquire one or more images of the workspace; the images may be stored in the frame buffer 235 in memory 210. In a second step 304, suitable techniques may be optionally implemented to minimize (or at least reduce) the noise and/or correct distortions in the detected sensor signals. In a third step 306, the analysis module 237 may analyze the images to determine whether there is sufficient overlap and/or distinction between the acquired images. If so, the registration module 239 may implement conventional computer-vision techniques (e.g., global registration algorithms) and a fine registration approach (e.g., an ICP algorithm) to establish registration among the sensors $102_{1-3}$ (step 308). If there is insufficient overlap between the fields of the sensors $102_{1-3}$ and/or insufficient details in the workspace 100, one or more registration objects 120 having distinctive signatures in 3D may be identified (step 310). Each sensor 102 may be first separately registered to the registration object(s) (step 312). Subsequently, the registration among the sensors $102_{1-3}$ may then be established based on the registration between each sensor 102 and the registration object(s) 120 (step 310). Alternatively, each sensor may record images of one or more people, moving equipment or other registration object(s) 120 standing in the workspace or passing throughout the workspace over a period of time (step 314). When a sufficient number of at least partially matching images are acquired, the images may be combined and processed to establish an accurate sensor registration (step 316). Optionally, after registration, the common reference frame of the sensors $102_{1-3}$ may be transformed to a global frame of the workspace 100 (step 318).

In some embodiments, registration using a registration object 120 is assisted by a passive or active information tag 120t associated with the object. In general, the tag 120t is affixed to the object or to a platform supporting the object (e.g., a table or pedestal supporting a robot arm), or is located close enough to the object (e.g., within a few centimeters) that the information will be accurate for registration purposes. Tag information may specify the location of the object 120 in space (e.g., in absolute coordinates as determined by, for example, GPS or a facility-wide location monitoring system) and may, in some instances, specify a pose of the object. For example, suppose the registration object 120 is a robot arm. The tag 120t may contain an identifier for the robot arm and its joint angles, enabling a computer vision system to computationally align an image of the object obtained with one sensor to an image obtained by a different sensor from a different perspective, based on the provided pose and identifier information. The identifier may be used to look up the object's size and geometry to help resolve the alignment. The geometric transformation producing alignment between images from different sensors also represents the registration between those sensors.

The information on the tag 120t may be active or passive, i.e., it may be broadcast or may instead by acquired by a reader. Examples of passive tags include optically detectable indicia such as barcodes; as used herein, the term "barcode" includes 1D and 2D barcodes, QR codes, retroreflective labels, and similar optically readable indicia. A barcode tag 120t may be read by the sensors 101 along their lines of sight; and since the sensors 101 are generally distributed around the workspace 100, the object 120 may include a plurality of tags 120t so that all sensors 101 have a line of sight to the encoded information. Alternatively, the sensors may communicate so that when one sensor 101 obtains tag information, it propagates the information to the other sensors 101.

Passive tags 120t may be readable electromagnetically rather than optically. For example, the tag may be a passive radiofrequency identification (RFID) or transponder circuit whose operation is powered by energy delivered by a reader. In some embodiments, the reader emits an interrogation signal that "wakes up" the RFID and causes it to impart the information, e.g., by a time-varying response to the interrogation signal.

While passive tags are typically detected and read by the sensors 101, active tags emit an electromagnetic signal for detection by one or more readers that may be located anywhere in the workspace 100—in the sensors 101, in the control system 112, or implemented as a stand-alone unit in communication with the control system 112. An active tag 120t may include an on-board power source, such as a battery, and may emit an optical (e.g., visible, infrared or ultraviolet) or RF signal. An optical signal requires a line of sight to the reader, and once again, if sensors 101 are configured to detect and interpret the signal, any sensor that has done so may share the information with the other sensors.

2) Registration of Sensors to Machinery

Registration of the sensors $102_{1-3}$ to the machinery under control in the workspace 100 can, in some cases, be achieved without any additional instrumentation, especially when the machinery has a distinctive 3D signature (e.g., a robot arm) and/or when the machinery is visible to at least one sensor 102 that is registered with respect to the other sensors as described above. The sensor(s) 102 to which the machinery is visible may first register to the machinery; based on this registration and the registration among the sensors $102_{1-3}$, other sensors to which the machinery is invisible may then register to the machinery. Alternatively, a registration target (e.g., the registration object 120 having a distinctive 3D signature) in the workspace 100 may be utilized to register the sensors $102_{1-3}$ to the machinery. Generally, the registration target is specially designed such that it is straightforward for the human operator H to determine the pose of the registration target with respect to the machinery. Again, the sensors $102_{1-3}$ may then be registered to the machinery via registration of the sensors $102_{1-3}$ to the registration target and the pose of the registration target relative to the machinery.

In various embodiments, the user interface shown on the display 220 may provide an image of the scene in the workspace 100 to allow the human operator H to manually designate certain parts of the image as key elements of the machinery under control. The registration of the sensors $102_{1-3}$ to the machinery may then be performed using the user-designated key elements. The image of the scene may include the actual scene viewed by the sensors $102_{1-3}$ or one or more additional sensors (e.g., RGB cameras) employed in the workspace 100. In addition, the image of the scene may include visible 3D point cloud data mapping the workspace 100. In one embodiment, the image of the scene includes geometry of at least a portion of the registration target. For example, the geometry may include a 2D or 3D CAD model of the machinery (e.g., the robot) and/or the workspace 100. Additionally, or alternatively, the geometry may include a model of the actual machinery and/or workspace constructed based on a 2D and/or 3D scan captured by the sensors $102_{1-3}$ (and/or other similar sensors), machinery or other equipment in the workspace 100. In cases where the robot 106 and/or other machinery controlled by the robot controller 108 is used as the registration target, the position of the robot and/or other machinery in the workspace 100 received and determined by the robot controller 108 may be combined with the CAD model thereof to obtain the fully posed geometry corresponding to the state of the workspace 100. In addition, the robot controller 108 and/or the control system 112 may continuously monitor the position of the robot and/or other machinery to ensure that no undesirable movement occurs while the scan data are acquired and accumulated.

The CAD model may be imprecise; thus, in some embodiments, various suitable techniques can be implemented to improve fit and quality of the CAD model. For example, floors and walls outside of a workcell (enclosing, for example, the machinery under control and the human operator H) in the workspace 100 may be excluded from the image of the scene and/or the CAD model to improve the registration accuracy. In one embodiment, the CAD model is simplified by taking out or deleting extraneous model components that do not contribute to registration; alternatively, the CAD model may be simplified into its minimum components, such as a stick figure. In some embodiments, the data acquired by the sensors $102_{1-3}$ can be used to improve the accuracy of the 2D or 3D CAD model by incorporating, for example, robot dress packages and/or end effectors as part of the model. In one embodiment, the 2D or 3D CAD model can also be overlaid on top of the point cloud data or visual image acquired by the sensors $102_{1\text{-}3}$ on the user interface shown on the display 220 as an alignment aid.

It should be noted that the geometry of the machinery used for registration is not necessarily the same one used for collision avoidance. Typically, collision geometry includes cabling and a dress package associated with the machinery and is biased towards inclusion for safety. On the other hand, registration geometry is unbiased, with different resolution and precision requirements, excludes non-rigid regions, and may have to exclude regions that provide unreliable measurements (e.g., dark or overly reflective surfaces or components that are thin and hard to measure). As described above, in some embodiments, the registration geometry of the registration target and/or workcell is constructed by scanning the actual registration target and/or workcell using the same or similar sensors as the ones that are used to perform registration (as opposed to the CAD model). This may lead to more reliable reference geometry that is not subject to deviations between the CAD model and the actual manufactured parts of the robot, whether intended or accidental.

The alignment/registration of the sensor system 101 to the machinery can be performed manually through the user interface. For example, the user may use a keyboard input, a mouse, a joystick or other suitable tools to specify the pose of each sensor, a group of sensors with known poses with respect to each other and/or with respect to the machinery shown on the display 220. This process can be automated or semi-automated. Yet another option to perform the alignment/registration is to select pairs of discrete features in the depth image and on the robot 106 shown on the user interface on the display 220, followed by an automated or semi-automated refinement step. For example, the human operator H or the registration module 239 may introduce a constraint by picking a single pair of features, and then trigger automatic registration of the sensor system 101 to the machinery in the presence of the constraint (i.e., ensuring the constraint to be satisfied); the constraint may improve reliability of the registration. In some embodiments, two constraints are added manually by the operator H or automatically by the registration module 239; this may further restrict the search space and make the automatic registration even more robust. Selecting three pairs of features may allow skipping a search for coarse feature correspondences, and instead going directly to the refinement step (such as using the ICP algorithm discussed above), thereby providing a reliable and accurate registration.

Referring again to FIG. 2, in various embodiments, automated registration of the sensors $102_{1\text{-}3}$ to the machinery involves use of a registration library 255; the registration library 255 includes one or more configuration parameters (such as a number of iterations for fine-tuning the registration, a number of 3D point cloud data per mesh, one or more convergence criteria, etc.) that are established in previous setups of the sensor system 101 and machinery in the workspace 100. Typically, each configuration parameter in the registration library 255 is established for a particular spatial arrangement of one or more specific robots 106, machinery, hardware configuration, and/or sensors $102_{1\text{-}3}$ in the workspace 100, and is stored along and in association with the respective image of the scene in the memory 210. In one embodiment, the control system 112 (e.g., the registration module 239) automatically compares the state (e.g., the orientation, position, etc.) of the robot(s) and/or machinery in the image of the scene against that of the robot(s) and/or machinery in the stored images of the scene in the registration library 255 and then identifies a stored image that provides the best matching state. The control system 112 (e.g., the registration module 239) may then retrieve the configuration parameter(s) associated with the best-matched state in the image of the scene, and based thereon, perform automated registration of the sensors $102_{1\text{-}3}$ to the machinery.

Occasionally, a single state of the robot or other machinery in the workspace 100 may not provide a registration target that adequately constrains all degrees of freedom (because, for example, not all sensors $102_{1\text{-}3}$ can observe the robot 106 in its current configuration and/or the robot features observed by the sensors $102_{1\text{-}3}$ are not sufficiently distinctive as described above); in various embodiments, the robot 106 and/or other machinery can be re-posed to one or more additional known states (e.g., the states that have been successfully set up previously for registration), either manually or automatically by the robot controller 108 and the control system 112 running a predetermined program. Data related to the state(s) of the robot 106 and/or other machinery and the data acquired by the sensors $102_{1\text{-}3}$ during this procedure can be combined to provide a larger registration data set that provides a more reliable and precise registration. In one embodiment, the combined data may be compared against the data stored in the registration library 255 so as to allow automated registration of the sensors $102_{1\text{-}3}$ to the machinery as described above. In addition, the data acquired during re-posing of the robot 106 and/or other machinery to the additional known state(s) may be stored in the registration library 255 for further comparison.

FIGS. 4A-4C are flow charts illustrating exemplary approaches for registering one or more sensors to machinery in a workspace. Referring first to FIG. 4A, in a first step 402, the machinery under control in the workspace is analyzed by, e.g., the control system 112, to determine whether it has a distinctive 3D signature and/or is visible to at least one sensor that is registered with respect to the other sensors. For example, if the images acquired by the sensors $102_{1\text{-}3}$ indicate that the machinery does not have rotational or translational symmetry in at least one dimension (e.g., a different profile of the machinery is presented when being viewed from a different angle), the machinery is determined to have a distinctive 3D signature. If so, the registration module 239 may first register to the machinery the sensor(s) 102 to which the machinery is visible (step 404). Based on the registration performed in step 404 and the registration among the sensors $102_{1\text{-}3}$, the registration module 239 may then register to the machinery other sensors to which the machinery is invisible (step 406). If the machinery does not have a distinctive 3D signature and/or is invisible to any sensors that are registered with respect to the other sensors, the registration module 239 may identify a registration target having distinctive signatures in 3D in the workspace (based on, for example, the images acquired by the sensor(s)) and determine the pose of the registration target with respect to the machinery (step 408). Subsequently, the registration module 239 may register the sensors $102_{1\text{-}3}$ to the registration target (step 410) and based on the registration in step 410 and the related pose of the registration target to the machinery, register the sensors $102_{1\text{-}3}$ to the registration target (step 512).

Alternatively, referring to FIG. 4B, in various embodiments, an image of the scene in the workspace 100 viewed by the sensors $102_{1\text{-}3}$ and/or additional sensor(s) is provided on a user interface shown on the display 220 (step 422). Optionally, the analysis module 237 may analyze the sensor images and provide visible 3D point cloud data mapping the workspace 100 on the image of the scene (step 424). In addition, the control system 212 may create a 2D or 3D CAD model of the machinery and/or the workspace 100 and display the model on the image of the scene (step 426). Additionally, or alternatively, the sensors $102_{1-3}$ (and/or other similar sensors), machinery or other equipment in the workspace 100 may perform a 2D and/or 3D scan on the actual machinery and/or workspace and construct a model thereof based on the scan (step 428). In one implementation, the position of the robot and/or other machinery in the workspace 100 received and determined by the robot controller 108 may be combined with the model created in step 426 or 428 to obtain the fully posed geometry thereof corresponding to the state of the workspace 100 (step 430). In various embodiments, one or more pairs of discrete features in the depth image and on the robot 106 shown on the user interface are selected manually by the operator or automatically by the control system 112 (step 432). Based thereon, the registration module 239 may perform registration using, for example, refinement steps described above (step 434). Additionally, or alternatively, the registration module 239 may introduce one or more constraints by picking one or more pair of features on the image of the scene (step 436), and then performing automatic registration of the sensor system 101 to the machinery in the presence of the constraint(s) (step 438).

Referring to FIG. 4C, in various embodiments, automated registration of the sensors $102_{1-3}$ to the machinery involves use of a registration library 255. In a step 442, a registration library 255 including one or more configuration parameters (such as a number of iterations for fine-tuning the registration, a number of 3D point cloud data per mesh, one or more convergence criteria, etc.) is created. In a second step 444, the registration module 239 automatically compares the state of the robot(s) and/or machinery in the image of the scene against that of the robot(s) and/or machinery in the stored images of the scene in the registration library 255 and then identifies a stored image that provides the best matching state. The registration module 239 may then retrieve the configuration parameter(s) associated with the best-matched state in the image of the scene (step 446), and based thereon, perform automated registration of the sensors $102_{1-3}$ to the machinery (step 448). Optionally, the control system 112 and the robot controller 108 may re-pose the robot 106 and/or other machinery to one or more additional known states (e.g., states that have been successfully employed previously for registration) (step 450). Data related to the state(s) of the robot 106 and/or other machinery and the data acquired by the sensors $102_{1-3}$ during this procedure can be combined to provide a larger registration data set (step 452). In one embodiment, the combined data can then be compared against the data stored in the registration library 255 to identify the image having the best matching state as described in step 446 (step 454). Subsequently, the registration module 239 can retrieve the configuration parameter(s) associated with the best-matched state in the image of the scene (step 446), and based thereon, perform automated registration of the sensors $102_{1-3}$ to the machinery (step 448). In some embodiments, the data acquired during re-posing of the robot 106 and/or other machinery to the additional known state(s) is stored in the registration library 255 (step 456).

3) Configuration of Sensors to Appropriately Cover a Scene

To determine an appropriate setup of the 3D sensors $102_{1-3}$ for best providing coverage of an area in the workspace 100, various considerations, such as occlusions caused by objects relative to the sensors $102_{1-3}$, must be considered. In various embodiments, the user interface shown on the display 220 provides an interactive 3D display that shows the coverage of all sensors $102_{1-3}$ to aid in configuration. If the system is configured with sufficient high-level information about the machinery being controlled, such as the location(s) of a dangerous part or parts of the machinery and the stopping time and/or distance, the control system 112 (e.g., the analysis module 237) may be configured to provide intelligent feedback as to whether the configuration of the sensors $102_{1-3}$ provides sufficient coverage, and/or suggest placement for additional sensors.

In some embodiments, the feedback further includes, for example, a simple enumeration of the areas that are not covered by the fields of the view of the sensors $102_{1-3}$ and/or proposed sensor locations for achieving the optimal scene coverage. In order to achieve optimal placement of the sensors $102_{1-3}$, in various embodiments, the analysis module 237 may, based on the feedback, cause a light source (not shown) to project onto the workspace 100 a signal or one or more light beams that outline the monitored coverage of the sensors $102_{1-3}$ and/or the proposed location for each sensor. The human operator H may then place or adjust the sensors $102_{1-3}$ based on the proposed sensor locations and/or the outlined coverage. In addition, the control system 112 (e.g., the analysis module 237) may aid the operator H in sensor placement through an augmented reality or virtual reality device that projects an image of the workspace 100 and the sensor coverage onto the display 220 (or a headset). The operator H may place/adjust the sensors based on their locations shown on the image on the display 220. The placement/adjustment of the sensors $102_{1-3}$ may be automated. For example, as described above, the sensors $102_{1-3}$ may be supported by software/hardware components $114_{1-3}$ that are configured to change the poses and positions of the sensors $102_{1-3}$. In various embodiments, based on the feedback provided by the analysis module 237, the control system 112 may be configured to adjust the software/hardware components $114_{1-3}$ so as to achieve the optimal scene coverage of the sensors $102_{1-3}$. In one implementation, the control system 112 further operates the machinery (e.g., move the robot via the controller 108) to a location that can be observed by all (or at least most) sensors $102_{1-3}$, thereby improving the accuracy of the registration, as well as dynamically determining occlusions or unsafe spaces that cannot be observed by the sensors $102_{1-3}$; these are marked as unsafe areas in the workspace 100.

In various embodiments, the control system 112 can be programmed to determine the minimum distance from the machinery at which it must detect a person in order to stop the machinery by the time the person reaches it (or a safety zone around it), given protective separation distances determined by the industrial standards, the robot or machine manufacturer, or through a dynamic model of the machinery (which includes conservative estimates of walking speed and other factors). Alternatively, the required detection distance can be input directly into the control system 112 via the display 220. The control system 112 can then analyze the fields of view of all sensors $102_{1-3}$ to determine whether the workspace 100 is sufficiently covered to detect all approaches. If the sensor coverage is insufficient, the control system 112 may propose new locations for existing sensors $102_{1-3}$, and/or locations for additional sensors, that may remedy the coverage deficiency. Otherwise, the control system 112 may default to a safe state and not permit any machinery to operate unless the analysis module 237 verifies that all approaches can be monitored effectively by the sensors $102_{1-3}$.

In some instances, there are areas that the sensors $102_{1-3}$ cannot observe sufficiently to ensure safety, but that are guarded by other means such as cages, etc. In this case, the user interface can be configured to allow the human operator H to indicate to the control system 112 that these areas may be considered safe, overriding the sensor-based safety analysis and/or any built-in inherent safety analysis.

FIGS. 5A and 5B are flow charts illustrating exemplary approaches for configuring sensors to appropriately cover a scene in a workspace. Referring first to FIG. 5A, in a first step 502, the user interface shown on the display 220 may provide an interactive 3D display that shows the coverage of all sensors $102_{1-3}$. If the system is configured with sufficient high-level information about the machinery being controlled, the control system 112 will provide intelligent feedback regarding the coverage area provided by the configuration of the sensors $102_{1-3}$, e.g., as a simple enumeration of the areas that are not covered by the fields of the view of the sensors $102_{1-3}$, proposed sensor locations for achieving an optimal scene coverage, and/or suggested placement for additional sensors (step 504). In one embodiment, the analysis module 237 may, based on the feedback, cause a light source to project onto the workspace 100 a signal or one or more light beams that outline the monitored coverage of the sensors $102_{1-3}$ and/or the proposed location for each sensor (step 506). Additionally, or alternatively, the analysis module 237 may cause an augmented reality or virtual reality device to project an image of the workspace 100 and the sensor coverage onto the display 220 (step 508). Based on the feedback provided by the analysis module 237 and/or the projected sensor coverage and/or the proposed locations of the sensors, the control system 112 may be configured to adjust the software/hardware components $114_{1-3}$ associated with the sensors so as to adjust the poses thereof, thereby achieving the optimal scene coverage (step 510). Optionally, the control system 112 further operate the machinery (e.g., moving the robot) to a location that can be observed by all (or at least most) sensors $102_{1-3}$ (step 512), thereby improving the accuracy of the registration, as well as dynamically determining occlusions or unsafe spaces that cannot be observed by the sensors $102_{1-3}$ (step 514).

Alternatively, referring to FIG. 5B, the control system 112 can be programmed to determine the minimum distance from the machinery at which it must detect a person in order to stop the machinery by the time the person reaches it (step 522). In some embodiments, the required detection distance can be input directly into the control system 112 (step 524). The control system 112 can then analyze the fields of view of all sensors $102_{1-3}$ to determine whether the workspace 100 is sufficiently covered to detect all approaches (step 526). If the sensor coverage is insufficient, the control system 112 may propose new locations for existing sensors $102_{1-3}$, and/or locations for additional sensors that may remedy the coverage deficiency (step 528). Otherwise, the control system 112 may default to a safe state and not permit any machinery to operate unless the analysis module 237 verifies that all approaches can be monitored effectively by the sensors $102_{1-3}$ (step 530).

4) Registration Validation During System Operation

Once the registrations among the sensors $102_{1-3}$ and between the sensors $102_{1-3}$ and the machinery have been achieved, it is critical that the sensors $102_{1-3}$ remain in the same locations and orientations during operations of the machinery in the workspace 100. In one embodiment, the initial registered state of the sensors can be stored in memory 210 so that it can be retrieved later in case the system is not registered during operation and/or the workcell is moved to a new physical location. When one or more sensors $102_{1-3}$ are accidentally moved or drift out of their registered positions, the sensors may be misaligned relative to each other and/or the machinery; as a result, the coverage area of the sensors $102_{1-3}$ may vary outside a predefined area and the control outputs will be invalid and result in a safety hazard. In various embodiments, the same approaches used for initial registration among the sensors $102_{1-3}$ and between the sensors $102_{1-3}$ and the machinery described above can be extended to monitor (i) continued accuracy of registration among the sensors $102_{1-3}$ and between the sensors $102_{1-3}$ and the machinery during operation and (ii) the coverage areas of the sensors $102_{1-3}$. For example, during initial registration described above, the control system 112 (e.g., the registration module 239) may compute a set of metrics capturing the fit accuracy of the observed data to a model of static elements in the workspace that is created during the registration process. These metrics may include, for example, registration validation, real-time robot tracking, etc. As the system operates, the same metrics are recalculated in real time. If the metrics or deviations of the metrics from initial metric values (i.e., obtained during initial registration) exceed a specified threshold, and/or if the coverage area is outside the bounds of what is expected to be observed, the registration during the system operation may be considered to be invalid and an error condition may be triggered. Subsequently, the robot 106 and/or machinery may be transitioned to a safe state where the robot/machinery is operated with a reduced speed or deactivated. Additionally, if during operation of the machinery, the sensors $102_{1-3}$ remain in position but the fields of view are obscured or blocked, and/or the measured sensor signals are degraded (e.g., through some failure of the system or through human action), the control system 112 may determine that the outputs are invalid and then transition the machinery to the safe state.

Figure 6:
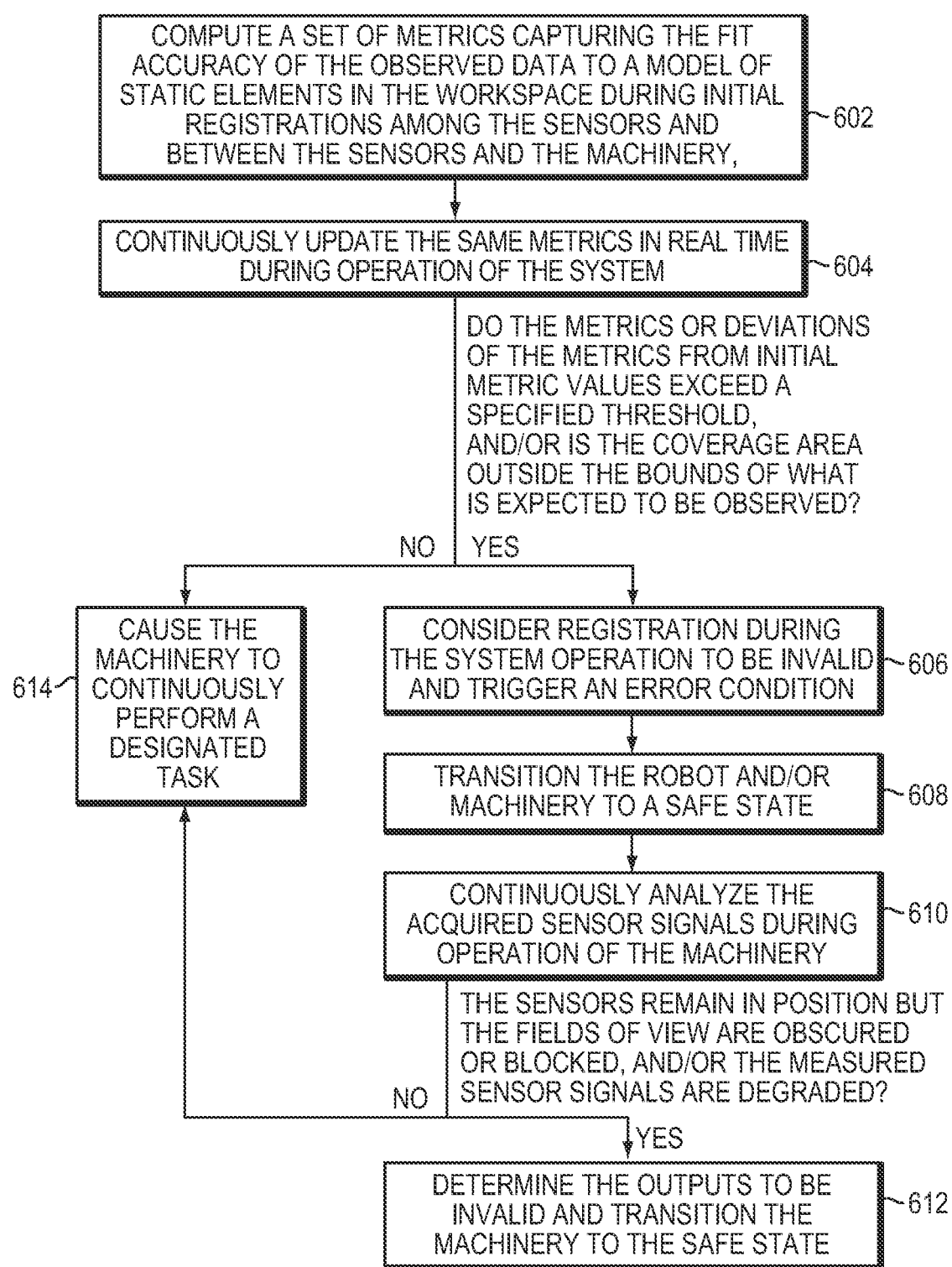
FIG. 6 is a flow chart illustrating an approach for validating registrations among sensors and between the sensors and machinery during operation of machinery in accordance with various embodiments of the present invention.

FIG. 6 is a flow chart illustrating an exemplary approach for validating registrations among sensors and between the sensors and machinery during operation of machinery. In a first step 602, during initial registrations among the sensors $102_{1-3}$ and between the sensors $102_{1-3}$ and the machinery, the registration module 239 may compute a set of metrics (e.g., registration validation, real-time robot tracking, etc.) capturing the fit accuracy of the observed data to a model of static elements in the workspace 100 that is created during the registration process. Upon completion of the registrations and as the system operates, the registration module 239 may continuously update the same metrics in real time (step 604). If the metrics or deviations of the metrics from initial metric values (i.e., obtained during initial registration) exceed a specified threshold, and/or if the coverage area is outside the bounds of what is expected to be observed, the registration during the system operation may be considered to be invalid and an error condition may be triggered (step 606). Subsequently, the robot 106 and/or machinery may be transitioned to a safe state where the robot/machinery is operated with a reduced speed or deactivated (step 608). Additionally, the analysis module 237 may continuously analyze the acquired sensor signals during operation of the machinery (step 610). If the sensors $102_{1-3}$ remain in position but the fields of view are obscured or blocked, and/or the measured sensor signals are degraded (e.g., through some failure of the system or through human action), the control system 112 may determine that the outputs are invalid and then transition the machinery to the safe state (step 612). If the metrics or deviations of the metrics from initial metric values do not exceed the specified threshold, the coverage area is within the bounds of the expected observation area, the fields of view of the sensors are not obscured or blocked, and the measured sensor signals are not degraded, the control system 112 may cause the machinery to continuously perform a designated task (step 614).

The term "controller" or "control system" used herein broadly includes all necessary hardware components and/or software modules utilized to perform any functionality as described above; the controller may include multiple hardware components and/or software modules and the functionality can be spread among different components and/or modules. For embodiments in which the functions are provided as one or more software programs, the programs may be coded in a suitable language as set forth above. Additionally, the software can be implemented in an assembly language directed to the microprocessor resident on a target computer; for example, the software may be implemented in Intel 80x86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM. Embodiments using hardware circuitry may be implemented using, for example, one or more FPGA, CPLD or ASIC processors.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of ensuring safe operation of industrial machinery in a workcell, the workcell including at least one object having on or in proximity thereto a source of information specifying at least one of a location of the object or a pose of the object, the method comprising the steps of:
   a. disposing a plurality of image sensors proximate to the workcell and acquiring, with at least some of the image sensors, a plurality of images of the workcell;
   b. acquiring at least one of location or pose information of at least one object in the workcell appearing in at least one of the images; and
   c. registering the sensors to each other and to the workcell based at least in part on the plurality of images and the acquired information.

2. The method of claim 1, wherein the information is acquired by a first one of the sensors and propagated electronically to the other sensors.

3. The method of claim 1, wherein the information is optical and detected by at least one of the sensors along a line of sight.

4. The method of claim 3, wherein the source of information is a barcode.

5. The method of claim 1, wherein the information is electromagnetic.

6. The method of claim 5, wherein the source of information is passive, and the information is detected by at least one reader emitting electromagnetic energy.

7. The method of claim 6, wherein the source of information is a passive RFID tag.

8. The method of claim 6, wherein the source of information is a retroreflective tag.

9. The method of claim 5, wherein the source of information emits an electromagnetic signal for detection by at least one reader.

10. The method of claim 9, wherein the electromagnetic signal is optical.

11. The method of claim 9, wherein the electromagnetic signal is radiofrequency.

12. A registration object for facilitating registration among sensors distributed about a workspace, the registration object comprising:
   a. a body portion including at least one asymmetric feature; and
   b. affixed or in close proximity to the body portion, a source of optically or electronically readable information specifying a location and a pose of the object, wherein the source of optically or electronically readable information includes a geometry of the body portion.

13. The object of claim 12, wherein the information is detectable by an optical sensor along a line of sight.

14. The object of claim 13, wherein the source of information is a barcode.

15. The object of claim 12, wherein the information is detectable by at least one reader emitting electromagnetic energy, the source of information being responsive to an interrogation signal.

16. The object of claim 12, wherein the source of information is a passive RFID tag.

17. The object of claim 12, wherein the source of information is a retroreflective tag.

18. The object of claim 12, wherein the source of information emits an electromagnetic signal for detection by at least one reader.

* * * * *